United States Patent
Lin et al.

(10) Patent No.: US 7,653,575 B2
(45) Date of Patent: Jan. 26, 2010

(54) AUCTION NEGOTIATION SUPPORT SYSTEMS AND METHODS

(75) Inventors: June-Ray Lin, Taichung County (TW); Hung-Wen Tung, Taoyuan County (TW)

(73) Assignee: Institute for Information Industry, Taipei (TW)

( * ) Notice: Subject to any disclaimer, the term of this patent is extended or adjusted under 35 U.S.C. 154(b) by 577 days.

(21) Appl. No.: 11/324,237

(22) Filed: Jan. 4, 2006

(65) Prior Publication Data

US 2007/0094092 A1    Apr. 26, 2007

(30) Foreign Application Priority Data

Oct. 24, 2005    (TW) .............. 94137161 A

(51) Int. Cl.
*G06Q 30/00* (2006.01)

(52) U.S. Cl. .............. 705/26; 705/1; 705/37; 705/80

(58) Field of Classification Search ........ 705/1, 705/26, 27, 37, 80, 35; 700/247
See application file for complete search history.

(56) References Cited

U.S. PATENT DOCUMENTS

| | | | | |
|---|---|---|---|---|
| 6,904,335 B2* | 6/2005 | Solomon | .............. | 700/247 |
| 7,085,740 B1* | 8/2006 | Meyers | .............. | 705/37 |
| 7,103,580 B1* | 9/2006 | Batachia et al. | .............. | 705/80 |
| 2002/0165817 A1* | 11/2002 | Rackson et al. | .............. | 705/37 |
| 2004/0133526 A1* | 7/2004 | Shmueli et al. | .............. | 705/80 |
| 2005/0065808 A1* | 3/2005 | Faltings | .............. | 705/1 |
| 2005/0183109 A1* | 8/2005 | Basson et al. | .............. | 725/4 |

* cited by examiner

*Primary Examiner*—Yogesh C Garg
(74) *Attorney, Agent, or Firm*—Birch, Stewart, Kolasch & Birch, LLP

(57) ABSTRACT

Methods for auction negotiation support executed by a negotiator agent module are provided. The best bid corresponding to a product/service and a total number of negotiator agent modules placing the best bid are received. It is determined that a bid is placed by a following strategy or an exceeding strategy. The following strategy indicates that, when the received best bid is not equal to the prior bid placed by the negotiator agent module, the negotiator agent module places the bid equal to the received best bid. The exceeding strategy indicates that, when the inverse of the total number of negotiator agent modules placing the best bid is lower than a predetermined threshold, the negotiator agent module places the bid advanced to the received best bid.

12 Claims, 7 Drawing Sheets

AUCTION NEGOTIATION SUPPORT SYSTEMS AND METHODS

BACKGROUND

The invention relates to negotiation support, and more particularly, to systems and methods of auction negotiation support.

Online auctions are increasingly being used for a variety of trading applications due to their ability to rapidly and automatically determine a winning bidder. Auctions, however, are liable to experience the 'price collision loop' problem, in which two agents give the same bid for a good/service, leading the auctioneer to try and raise the price and try again, leading to the same bid collision. An auctioneer may resolve this problem by randomly selecting a winner, thus, some of the colliding bidders are disqualified. With an increased number of bidders, multiple price collisions may occur between the same pairs of agents with the same preferences often contend for similar goods/services. The occurrence of multiple price collisions creates a need for agent negotiations.

SUMMARY

Methods of negotiation support for good/service auction procedures, executed by a processing unit, in which placed bids in a virtual bidding room module by one negotiator agent module are provided. An embodiment of a method comprises the following steps. The best bid corresponding to a product/service and a total number of negotiator agent modules placing the best bid are received. It is determined that a bid is placed by a following strategy or an exceeding strategy. In the following strategy indicates when the received best bid is not equal to the prior bid placed by the negotiator agent module, the negotiator agent module places the bid equal to the received best bid to the virtual bidding room module. In the exceeding strategy indicates when the inverse of the total number of negotiator agent modules placing the best bid is lower than a predetermined threshold, the negotiator agent module places the bid advanced to the received best bid to the virtual bidding room module.

The method may further comprise the following steps. A reserve price is provided. The bid is placed by the following strategy or the exceeding strategy when the received best bid is advanced to the reserve price.

A machine-readable storage medium storing a computer program which, when executed, performs the methods of negotiation support for goods/services auction procedures are also provided.

Methods for negotiation and clearing procedures of auction negotiation support, executed by a processing unit of a negotiation mediator module, are provided. An embodiment of a method comprises the following steps. A negotiable collision set comprising a first and a second unclosed products/services is detected. The first negotiator agent module contends with the second negotiator agent module for the first unclosed product/service. The first negotiator agent module contends with the second negotiator agent module for the second unclosed product/service. The first negotiator agent module has a probability of winning the first or second product/service. The second negotiator agent module has the same probability as the first negotiator agent module of winning the first or second unclosed product/service. A suggestion for winning probability exchanges between the first and second negotiator agent modules is generated contingent upon preference levels associated with the first and second unclosed products/services as configured by the first and second negotiator agent modules. The generated suggestion indicates that the first negotiator agent module exchanges a second winning probability for the second unclosed product/service with a first winning probability for the first unclosed product/service owned by the second negotiator agent module.

The method may further comprise the following steps. A first preference level for the first unclosed product/service configured by the first negotiator agent module is provided. A second preference level for the second unclosed product/service configured by the first negotiator agent module is provided. A third preference level for the first unclosed product/service configured by the second negotiator agent module is provided. A fourth preference level for the second unclosed product/service configured by the second negotiator agent module is provided. The suggestion for winning probability exchanges is generated when the first preference level is higher than the second preference level and the fourth preference level is higher than the third preference level.

The method may further comprise the following steps. It is performed that the first negotiator agent module exchanges a second winning probability for the second unclosed product/service with a first winning probability for the first unclosed product/service owned by the second negotiator agent module. A winning negotiator agent module for the first or second product/service is randomly selected contingent upon the exchanged winning probabilities.

Systems for auction negotiation support are provided. An embodiment of a system comprises a first negotiator agent module, a second negotiator agent module and a negotiation mediator module. The negotiation mediator module is coupled to the first and second negotiator agent modules. The negotiation mediator module detects a negotiable collision set comprising a first and a second unclosed products/services. The first unclosed product/service is contended by the first and second negotiator agent modules. The second unclosed product/service is contended by the first and second negotiator agent modules. The first negotiator agent module has a probability of winning the first or second product/service, and the second negotiator agent module has the same probability as the first negotiator agent module of winning the first or second unclosed product/service. The negotiation mediator module generates a suggestion for winning probability exchanges between the first and second negotiator agent modules contingent upon preference levels associated with the first and second unclosed products/services configured by the first and second negotiator agent modules. The generated suggestion indicates that the first negotiator agent module exchanges a second winning probability for the second unclosed product/service with a first winning probability for the first unclosed product/service owned by the second negotiator agent module.

The negotiation mediator module may further acquire a first preference level for the first unclosed product/service configured by the first negotiator agent module, acquire a second preference level for the second unclosed product/service configured by the first negotiator agent module, acquire a third preference level for the first unclosed product/service configured by the second negotiator agent module, acquire a fourth preference level for the second unclosed product/service configured by the second negotiator agent module and generate the suggestion for winning probability exchanges when the first preference level is higher than the second preference level and the fourth preference level is higher than the third preference level.

The negotiation mediator module may further perform that the first negotiator agent module exchanges a second winning probability for the second unclosed product/service with a first winning probability for the first unclosed product/service owned by the second negotiator agent module, and randomly select a winning negotiator agent module for the first or second product/service contingent upon the exchanged winning probabilities.

An instance of the described preference level is represented by a preference coefficient, and a higher preference coefficient indicates a higher preference level.

Another instance of the described preference level is represented by a predetermined value configured in an exceeding strategy. The exceeding strategy indicates that the first or second negotiator agent module places a bid advanced to the best bid to a virtual bidding room module when the inverse of a total number of negotiator agent modules placing the best bid is lower than the predetermined value. A higher predetermined value indicates a higher preference level.

Still another instance of the described preference level is represented by the difference between the best bid and a reserve price for a particular unclosed product/service. The reserve price indicates the least acceptable price. A higher difference indicates a higher preference level.

The describe service may be a nursing shift.

BRIEF DESCRIPTION OF THE DRAWINGS

The invention will become apparent by referring to the following detailed description of embodiments with reference to the accompanying drawings, wherein.

DESCRIPTION

Figure 1:
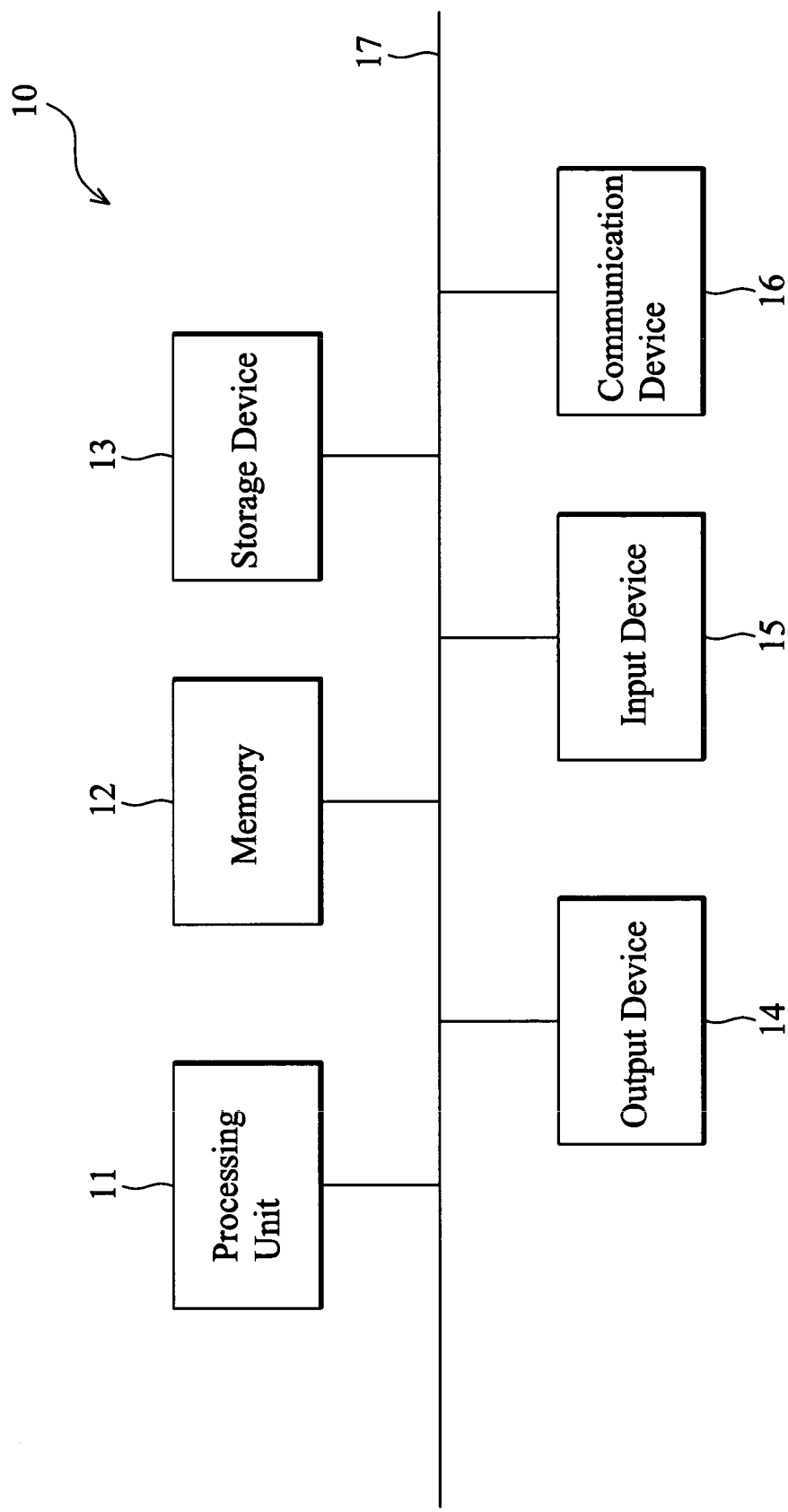
FIG. 1 is a diagram of a hardware environment applicable to an embodiment of auction negotiation support system.

FIG. 1 is a diagram of a hardware environment applicable to an embodiment of auction negotiation support system 10, comprising a processing unit 11, a memory 12, a storage device 13, an output device 14, an input device 15 and a communication device 16. The processing unit 11 is connected by buses 17 to the memory 12, storage device 13, output device 14, input device 15 and communication device 16 based on Von Neumann architecture. There may be one or more processing units 11, such that the processor of the computer comprises a single central processing unit (CPU), a micro processing unit (MPU) or multiple processing units, commonly referred to as a parallel processing environment. The memory 12 is preferably a random access memory (RAM), but may also include read-only memory (ROM) or flash ROM. The memory 12 preferably stores program modules executed by the processing unit 11 to perform auction negotiation support functions. Generally, program modules include routines, programs, objects, components, scripts, Web pages, or others, that perform particular tasks or implement particular abstract data types. Moreover, those skilled in the art will understand that some embodiments may be practiced with other computer system configurations, including hand-held devices, multiprocessor-based, microprocessor-based or programmable consumer electronics, network PCs, minicomputers, mainframe computers, and the like. Some embodiments may also be practiced in distributed computing environments where tasks are performed by remote processing devices linked through a communication network. In a distributed computing environment, program modules may be located in both local and remote memory storage devices based on various remote access architecture such as DCOM, CORBA, Web objects, Web Services or other similar architectures. The storage device 13 may be a hard drive, magnetic drive, optical drive, portable drive, or nonvolatile memory drive. The drives and associated computer-readable media thereof (if required) provide nonvolatile storage of computer-readable instructions, data structures and program modules. The processing unit 11, controlled by program modules received from the memory 12 and from an operator through the input device, directs auction negotiation support functions.

Figure 2:
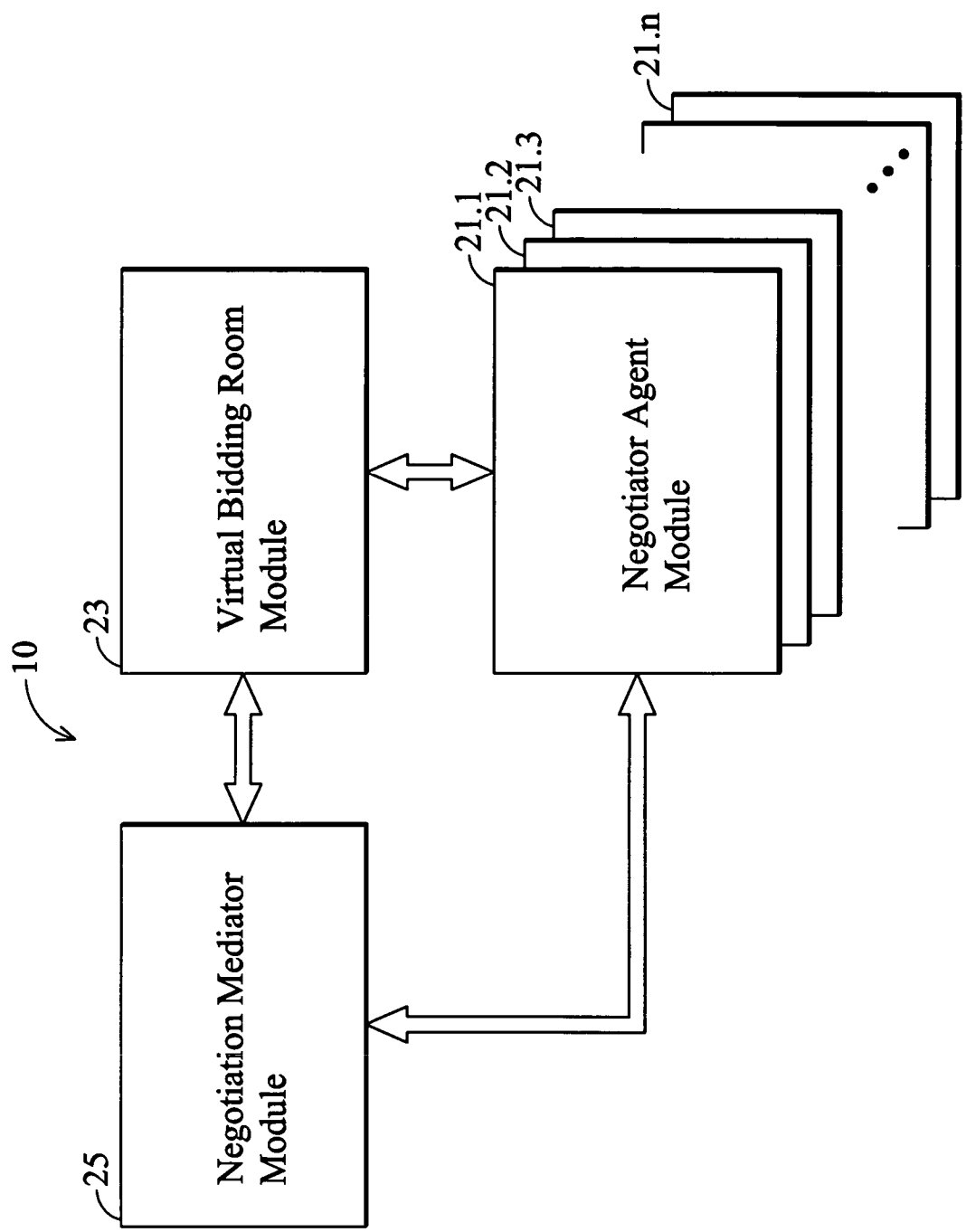
FIG. 2 is the software architecture diagram of an embodiment of an auction negotiation support system.

FIG. 2 is the software architecture diagram of an embodiment of an auction negotiation support system. The auction negotiation support system 10 (also called an auctioneer) comprises negotiator agent modules 21.1 to 21.n, a virtual bidding room module 23 and a negotiation mediator module 25, where n represents a total number of negotiation mediator modules. In one embodiment, there are a number of nurses (including in-hospital nurses and traveling nurses) bidding for shifts in the next week at a hospital. Each shift may be a four-hour slot with specific job description and required qualifications. Each nurse has one agent from negotiator agent modules 21.1 to 21.n, acting on its behalf and acquiring the shift information of the hospital. For example, the auctions begins on Monday, and after all auctions end, the negotiation mediator module 25 mediates the negotiations and then performs certain clearings. Those skilled in the art will realize the negotiator agent modules 21.1 to 21.n, the virtual bidding room module 23 and the negotiation mediator module 25 in a single or multiple computer systems, communicating by simple object access protocol (SOAP) therebetween.

Figure 3:
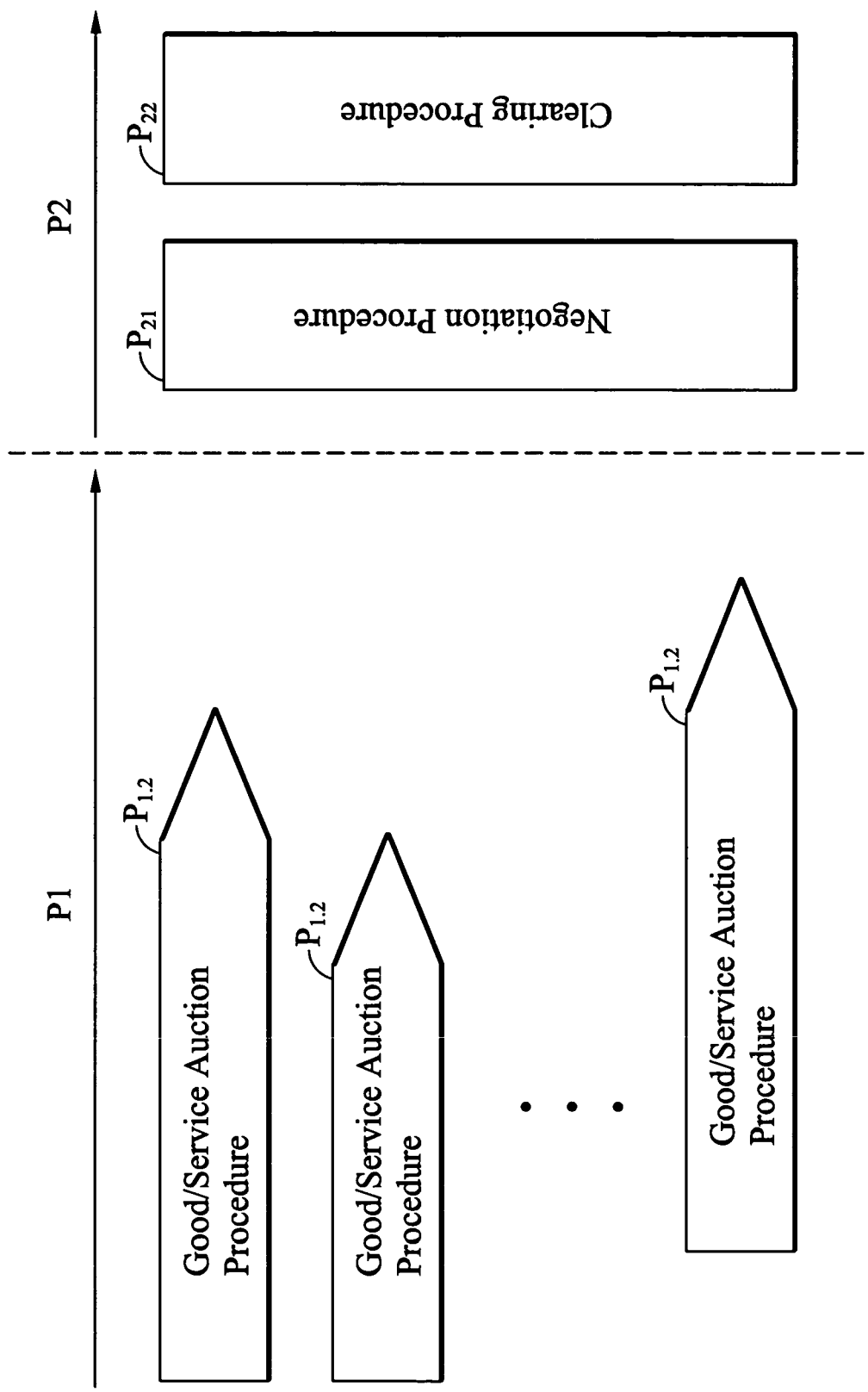
FIG. 3 is a diagram illustrating two phases of auction negotiation.

An embodiment of auction negotiation may be divided into two phases, auction and post-auction negotiation. FIG. 3 is a diagram illustrating two phases of auction negotiation. In the auction phase P1, an operator initiates multiple auctions using the virtual bidding room module 23 (as shown in FIG. 2). Negotiator agent modules 21.1 to 21.n join the initiated auctions to bid for the provided goods/services (such as nursing shifts). The virtual bidding room module 23 comprises multiple good/service auction procedures $P_{1.1}$ to $P_{1.m}$, where m represents a total number of goods/services. One of the goods/services auction procedures, $P_{1.1}$ to $P_{1.m}$, comprises process steps for bidding a particular good/service by negotiator agent modules 21.1 to 21.n. After closing all auctions occurring in a predetermined period of time, the post-auction negotiation phase P2 is entered. In the post-auction negotiation phase P2, the negotiation mediator module 25 performs a negotiation procedure $P_{21}$ to detect all negotiable collisions occurring in the results of goods/services auction procedures $P_{1.1}$ to $P_{1.m}$ and subsequently mediate these potential collisions. After all collisions are settled, the negotiation mediator module 25 performs a clearing procedure $P_{22}$ to exchange bidding opportunities of the provided goods/services between negotiator agent modules according to the previously mediated results. Details of auction negotiation are further described in the following.

Figure 4:
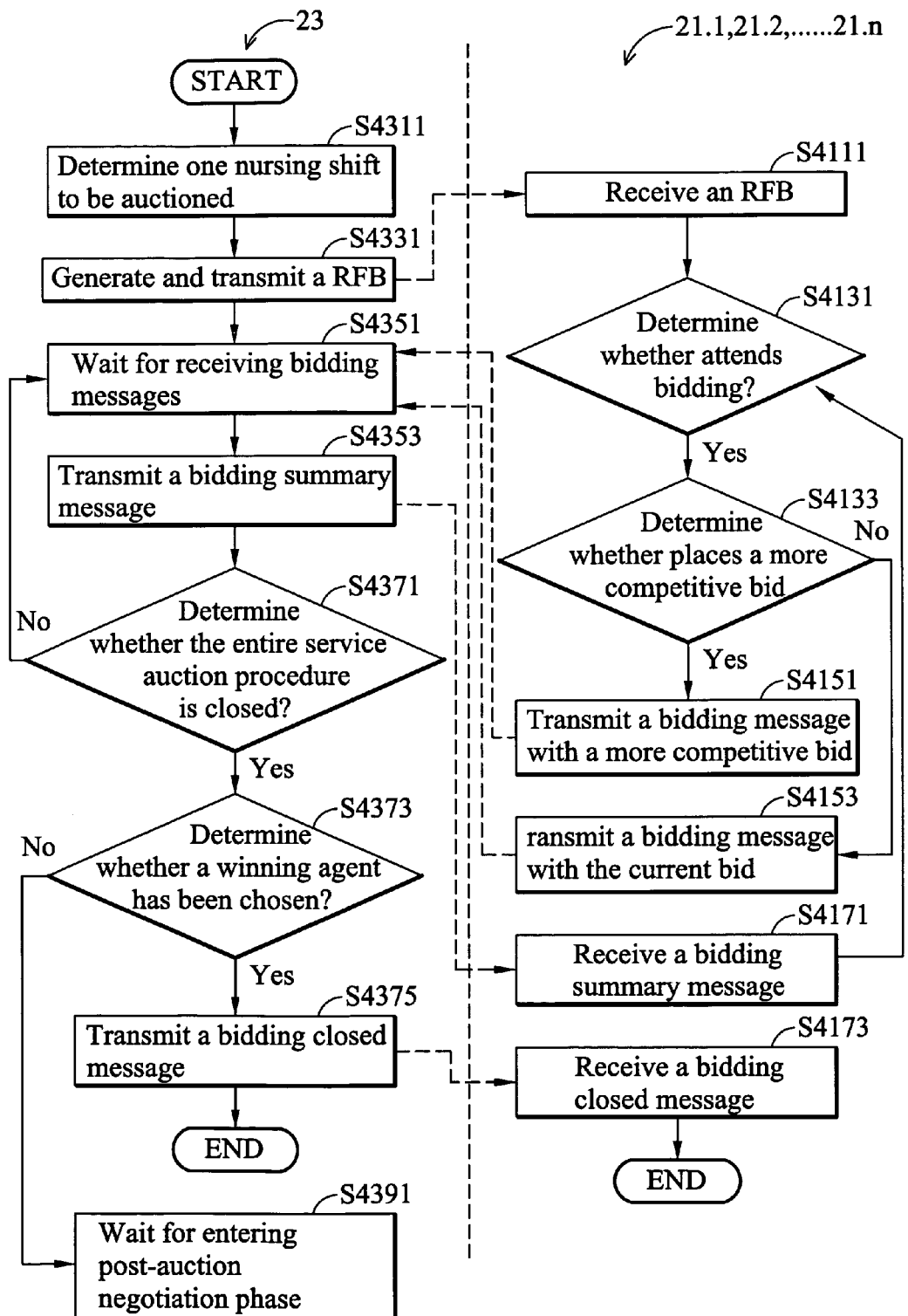
FIG. 4 is a flowchart of an embodiment of a method of auction negotiation support for a good/service auction procedure.

FIG. 4 is a flowchart of an embodiment of a method for a good/service auction procedure of auction negotiation support, divided into two sections, a left section showing steps performed by the virtual bidding room module 23, and a right section showing steps performed by one of the negotiator agent modules 21.1 to 21.n, separated by dashed lines for added clarity.

In step S4311, one nursing shift to be auctioned is determined from multiple nursing shifts. In step S4331, a request for bidding (RFB) is generated and transmitted to one of the negotiator agent modules 21.1 to 21.n. The generated RFB includes job description, time slot of the auctioned nursing shift and an initial price.

In step S4111, a negotiator agent module receives the RFB from the virtual bidding room module 23. The negotiator agent module may store information regarding multiple available time slots, and a bidding strategy and a predetermined reserve price for each available time slot. The available time slots may be stored in a digital schedule, representing workable time slots for a bidder (nurse). The predetermined reserve price represents the lowest acceptable price for a particular time slot providing nursing service. The following strategy or exceeding strategy can be used to bid for each nursing shift by the negotiator agent module. The following strategy is that, if another negotiator agent module places a more competitive bid (i.e. a bid better than the previous bid placed by the negotiator agent module), then the negotiator agent module follows it by placing the same bid until the reserve price is reached, and, if there is no negotiator agent module placing a more competitive bid, then the negotiator agent module stays at the current bid. For example, a negotiator agent module detecting that another negotiator agent module has placed a lower bid for the auctioned nursing shift, follows it by placing the same bid until the reserve price is reached, and otherwise, stays at the current bid. The exceeding strategy, if staying at the current bid will cause the probability of winning the auctioned nursing shift to be lower than a), a more competitive bid is placed, and otherwise, the current bid is maintained.

In step S4131, it is determined whether the negotiator agent module attends bidding in the next run, and, if so, the process proceeds to step S4133. For example, when detecting that the available time slots stored in the negotiator agent module conflict with the time slot contained in the RFB, the negotiator agent module determines not to attend this nursing shift auction. Alternatively, when the current bid (i.e. the best bid) is lower than the reserve price, the negotiator agent module determines not to attend this nursing shift auction. In step S4133, it is determined whether the negotiator agent module places a more competitive bid according to the selected bidding strategy, the current bid and the number of agents (i.e. negotiator agent modules) placing the current bid. If so, the process proceeds to step S4151, otherwise, to step S4153. In step S4151, a bidding message with a more competitive bid is transmitted to the virtual bidding room module 23. In step S4153, a bidding message with the current bid is transmitted to the virtual bidding room module 23.

In step S4351, the virtual bidding room module 23 waits for receiving bidding messages from negotiator agent modules. In step S4353, a bidding summary message is transmitted to the negotiator agent modules 21.1 to 21.n. The bidding summary message comprises the current bid and the number of agents placing the current bid. After a negotiator agent module receives the bidding summary message as shown in step S4171, step S4131 is performed for subsequent biddings. In step S4371, the virtual bidding room module 23 determines whether the entire service auction procedure is closed. If so, the process proceeds to step S4373, otherwise, to step S4351. For example, in step S4371, when detecting that now is/exceeds an instant closing the entire service auction procedure, the entire service auction procedure is closed. Alternatively, receiving no new bidding message until a predetermined period of time from the last bidding message expires, the entire service auction procedure is closed.

In step S4373, it is determined whether a winning agent (i.e. a winning negotiator agent module) has been chosen. If so, the process proceeds to step S4375, otherwise, to step S4391. Specifically, step S4373 detects whether there is only one agent placing the current bid (i.e. the best bid). If so, the only agent placing the current bid is determined to be a winning agent, otherwise, no winning agent is determined, in other words, bidding collisions occur. In step S4375, bidding closed messages are transmitted to negotiator agent modules 21.1 to 21.n. The bidding closed message may comprise both the winning agent and the best bid, or only the best bid. In step S4391, waits for entering the post-auction negotiation phase P2 described in the following.

In the beginning of the post-auction negotiation phase P2, the virtual bidding room module 23 transmits information regarding the unclosed nursing shifts, and the current bid and agents placing the current bid to the negotiation mediator module 25 for subsequent processing.

Figure 5A:
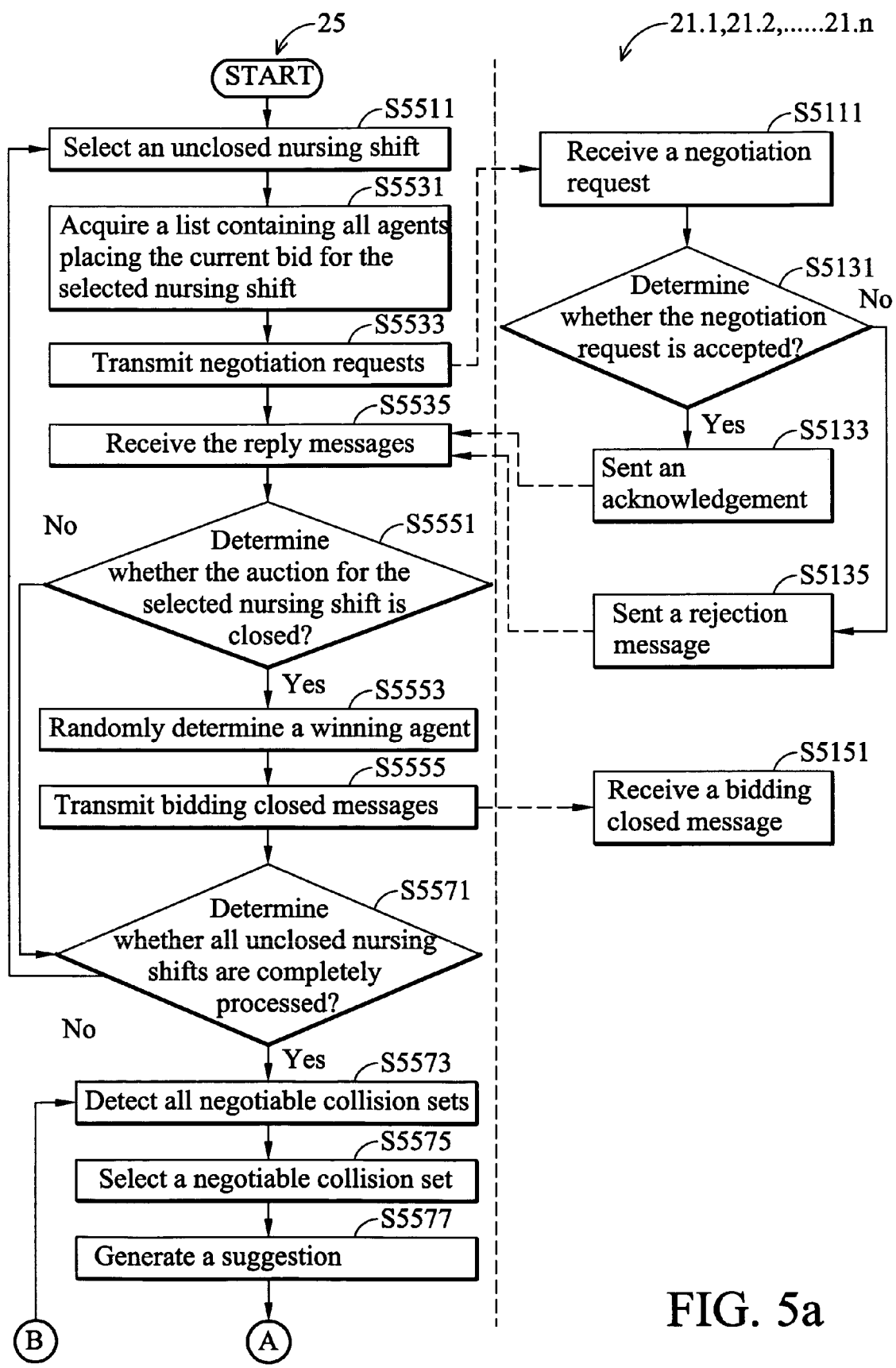
FIGS. 5a and 5b are flowcharts of an embodiment of a method of auction negotiation support for negotiation and clearing procedures.
Figure 5B:
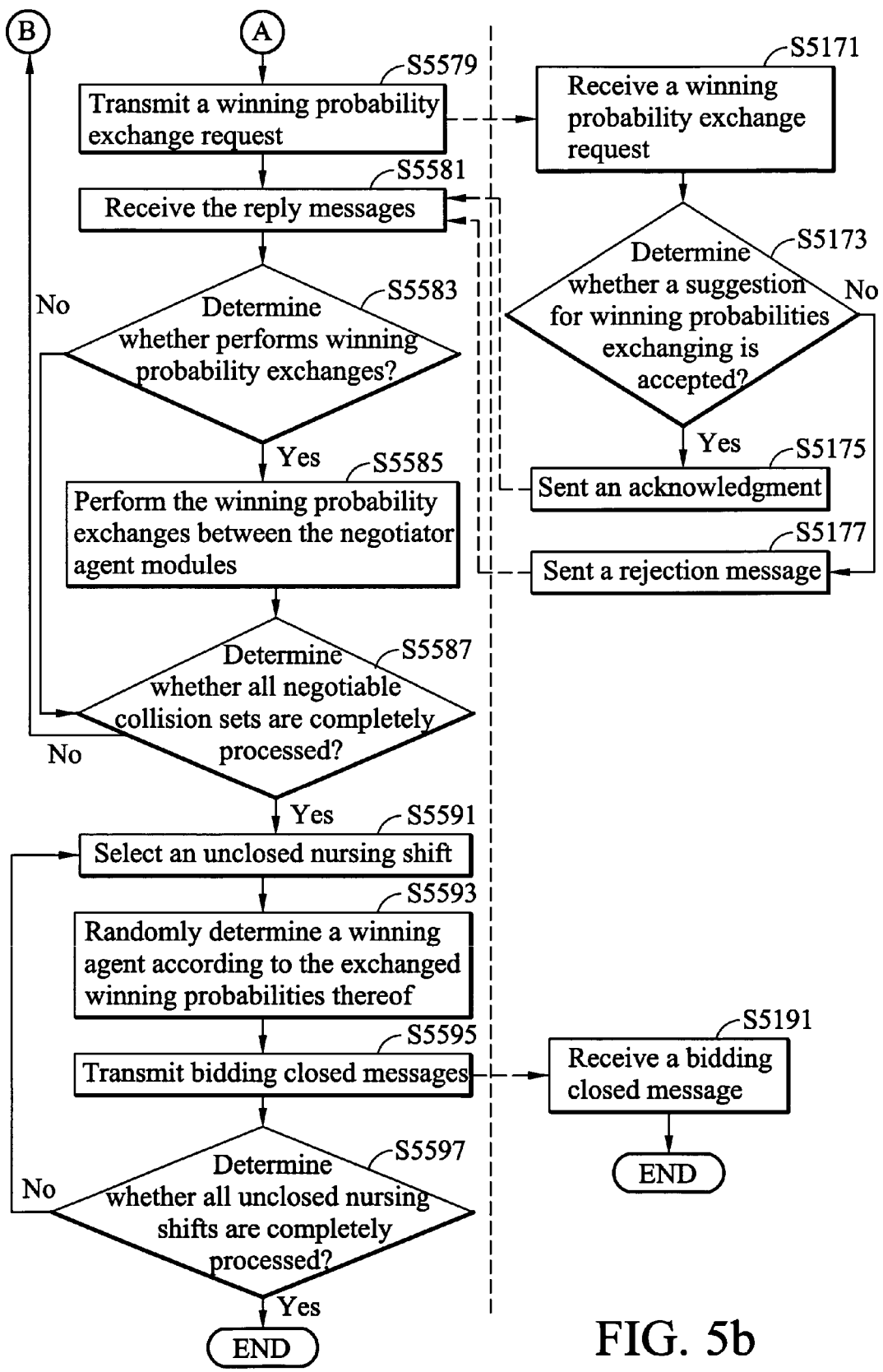

FIGS. 5a and 5b are flowcharts of an embodiment of a method for negotiation and clearing procedures of auction negotiation support, divided into two sections, a left section showing steps performed by the negotiation mediator module 25, and a right section showing steps performed by one of the negotiator agent modules 21.1 to 21.n, separated by dashed lines for added clarity. Those skilled will recognize that certain steps in the left section may be performed by the virtual bidding room module 23 as shown in FIG. 2.

In step S5511, the negotiation mediator module 25 selects one nursing shift from multiple unclosed nursing shifts. In step S5531, a list containing all agents (i.e. negotiator agent modules) placing the current bid for the selected nursing shift is acquired. In step S5553, negotiation requests are transmitted to all negotiator agent modules in the acquired list. In step S5111, the negotiation request is received by one of the negotiator agent modules 21.1 to 21.n. In step S5131, it is determined whether the negotiation request is accepted. If so, the process proceeds to step S5133, otherwise, to step S5135. In step S5133, an acknowledgement corresponding to the received negotiation request is sent. In step S5135, a rejection message corresponding to the received negotiation request is sent.

In step S5535, the negotiation mediator module 25 receives the reply messages (including acknowledgements and rejection messages) from the negotiator agent modules in the acquired list. In step S5551, it is determined whether the auction for the selected nursing shift is closed. If so, the process proceeds to step S5553, and otherwise, proceeds to step S5571. Specifically, step S5551 determines whether a rejection message is received, and if so, the auction for the selected nursing shift is closed. In step S5553, a winning agent (i.e. a winning negotiator agent module) is randomly determined from all agents in the acquired list, where each agent has an even chance of winning the selected nursing shift. In step S5555, bidding closed messages are transmitted to all negotiator agent modules. The bidding closed message may comprise information regarding the winning agent. In step S5571, it is determined whether all unclosed nursing shifts are completely processed. If so, the process proceeds to step S5573, otherwise, it returns to step S5511 to process another unclosed nursing shift.

In step S5573, all negotiable collision sets are detected. Each negotiable collision set is a collision set X having the same set of agents (negotiator agent modules) participating in the same auctions for nursing shifts and each agent has an even chance of being a winning agent for each contended nursing shift. For example, the negotiator agent modules 21.1, 21.2 and 21.3 are involved in a bidding collision (i.e. an unclosed nursing shift) $b_1$, and the negotiator agent modules 21.1, 21.2 and 21.4 are involved in another bidding collision $b_2$. The negotiator agent modules 21.1 and 21.2 have a ⅓ probability of being a winning agent in $b_1$, and $b_2$, thus, the bidding collisions $b_1$ and $b_2$ form a negotiable collision set.

In step S5575, one negotiable collision set is selected from at least one unprocessed negotiable collision set. In step S5577, a suggestion regarding winning possibility exchanges between the negotiator agent modules in the selected negotiable collision is generated contingent upon the preference levels of the contended nursing shifts configured in such negotiator agent modules, where such winning possibility exchanges will produce an optimum benefit. The preference level for a nursing shift may be represented by a preference coefficient, ω configured in the described exceeding strategy or the difference between the current bid and the described reserve price. A greater preference coefficient, ω or difference between the current bid and the described reserve price indicates a higher preference level.

In one instance, the negotiator agent module 21.1 may configure preference coefficients for the unclosed nursing shifts $b_1$ and $b_2$ to 0.8 and 0.2. The negotiator agent module 21.2 may further configure preference coefficients for the unclosed nursing shifts $b_1$, and $b_2$ to 0.2 and 0.8. If the negotiator agent module 21.1 exchanges the winning probability for the nursing shift $b_2$ with the winning probability for the nursing shift $b_1$ owned by the negotiator agent module 21.2, an optimum benefit is produced. The consequence of the described exchanges is that the negotiator agent module 21.1 has a ⅔ probability of being a winning agent in $b_1$ but has a zero probability of being a winning agent in $b_2$. The negotiator agent module 21.2 has a ⅔ probability of being a winning agent in $b_2$ but has a zero probability of being a winning agent in $b_1$.

In another instance, the negotiator agent module 21.1 may configure ω for the unclosed nursing shifts $b_1$, and $b_2$ to 0.333 and 0.1. The negotiator agent module 21.2 may further configure ω for the unclosed nursing shifts $b_1$ and $b_2$ to 0.1 and 0.333. If negotiator agent module 21.1 exchanges the winning probability for the nursing shift $b_2$ with the winning probability for the nursing shift $b_1$ owned by the negotiator agent module 21.2, an optimum benefit is produced.

In still another instance, the negotiator agent module 21.1 may configure the reserve prices for the unclosed nursing shifts $b_1$, and $b_2$ to 800 and 1000, as well as, the negotiator agent module 21.2 may configure the reserve prices for the unclosed nursing shifts $b_1$ and $b_2$ to 1000 and 800. As the current bids for the both nursing shifts $b_1$ and $b_2$ are 1200, if the negotiator agent module 21.1 exchanges the winning probability for the nursing shift $b_2$ with the winning probability for the nursing shift $b_1$ owned by the negotiator agent module 21.2, an optimum benefit is produced.

In step S5579, a winning probability exchange request is transmitted to all negotiator agent modules in the selected negotiable collision set, the winning probability exchange request comprising the generated suggestion for winning probability exchanges. Those skilled in the art will realize that the winning probability exchange request is transmitted to negotiator agent modules involving exchanges other than all negotiator agent modules in the selected negotiable collision set. In step S5171, one of the negotiator agent modules 21.1 to 21.$n$ receives the winning probability exchange request. In step S5173, it is determined whether the suggestion for winning probabilities exchanging is accepted. If so, the process proceeds to step S5175, otherwise, to step S5177. In step S5175, an acknowledgment corresponding to the winning probability exchange request is sent. In step S5177, a rejection message corresponding to the winning probability exchange request is sent.

In step S5581, the negotiation mediator module 25 receives the reply messages (including acknowledgements and rejection messages) from the negotiator agent modules. In step S5583, it is determined whether performs winning probability exchanges. If so, the process proceeds to step S5585, and otherwise, to step S5587. Specifically, step S5583 determines whether a rejection message is received, and if so, the winning probabilities are not exchanged. In step S5585, the winning probability exchanges between the negotiator agent modules are performed contingent upon the suggestion content. In step S5587, it is determined whether all negotiable collision sets are completely processed. If so, the process proceeds to step S5591, and otherwise, returns to step S5575 to deal with another negotiable collision set.

In step S5591, the negotiation mediator module 25 selects one nursing shift from at least one unclosed nursing shift and acquires a list containing all negotiator agent modules placing the current bid (i.e. the best bid) for the selected nursing shift. In step S5593, a winning agent (i.e. a winning negotiator agent module) is randomly determined from all agents in the acquired list according to the exchanged winning probabilities thereof, where each agent may have uneven possibility of winning the selected nursing shift. In step S5595, bidding closed messages are transmitted to all negotiator agent modules in the acquired list. The bidding closed message may comprise information regarding the winning agent. In step S5597, it is determined whether all unclosed nursing shifts are completely processed. If so, ends the entire auction negotiation support method, otherwise, returns to step S5591 to process another unclosed nursing shift.

Figure 6:
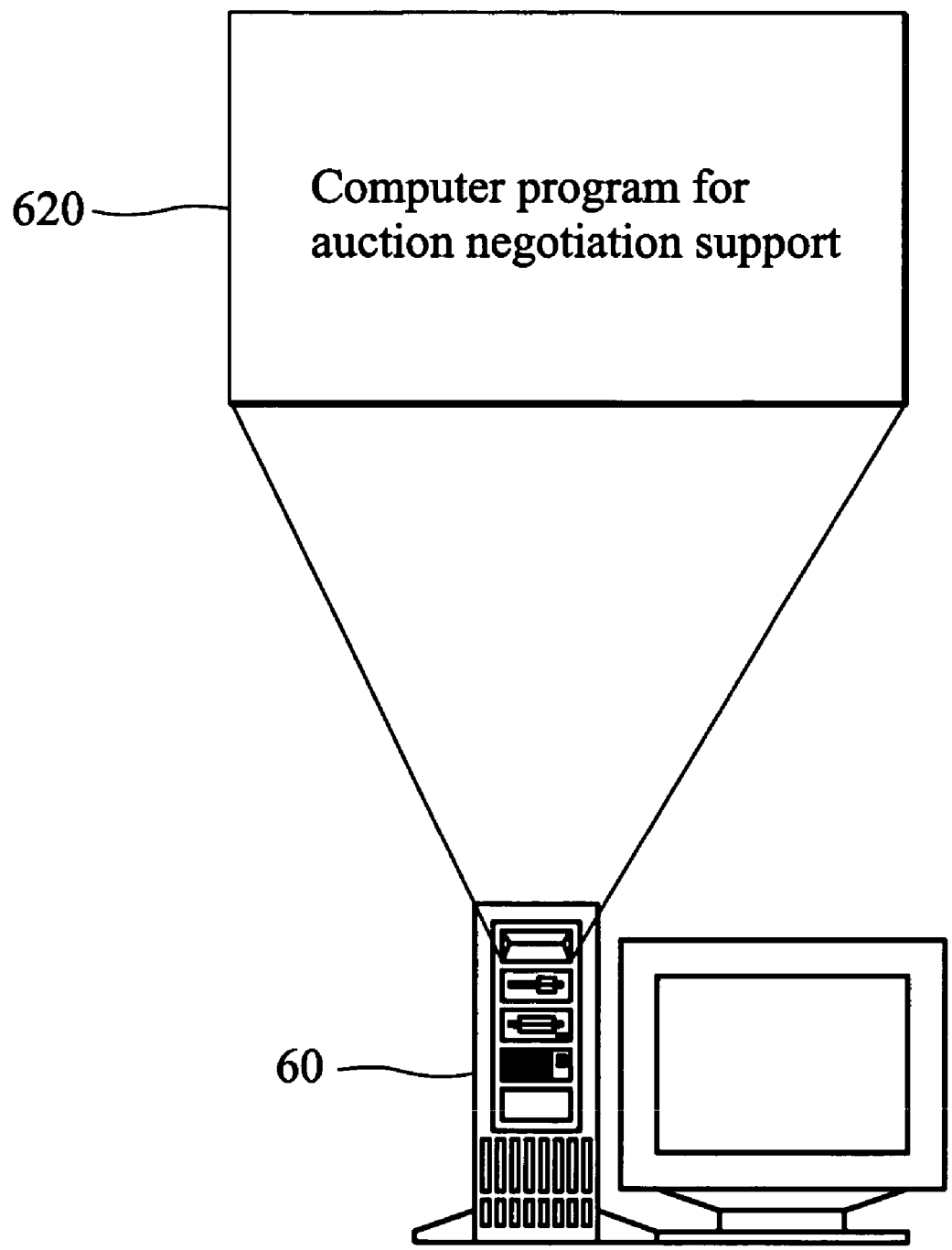
FIG. 6 is a diagram of a storage medium storing a computer program providing an embodiment of a method of auction negotiation support.

Also disclosed is a storage medium as shown in FIG. 6 storing a computer program 620 providing the disclosed method of auction negotiation support. The computer program product includes a storage medium 60 having computer readable program code embodied therein for use in a computer system.

Auction negotiation support systems and methods, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The disclosed methods and systems may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. A method for auction negotiation support, executed by a processing unit of a negotiation mediator module, performing negotiation and clearing procedures, comprising:

detecting, by the processing unit, a negotiable collision set comprising a first and a second unclosed products/services, wherein the first and second unclosed products/services are distinct, the first unclosed product/service is contended for by a first and a second negotiator agent modules, the second unclosed product/service is contended for by the first and the second negotiator agent modules, the first negotiator agent module has a probability of winning the first or second product/service, the second negotiator agent module has the probability of winning the first or second unclosed product/service, and the first and second negotiator agent modules have the same probability; and generating, by the processing unit, a suggestion for winning probability exchanges between the first and second negotiator agent modules contingent upon preference levels associated with the first and second unclosed products/services configured by the first and second negotiator agent modules, the generated suggestion comprising information regarding that the first negotiator agent module has exchanged a second winning probability for the second unclosed product/service with a first winning probability for the first unclosed product/service owned by the second negotiator agent module;

wherein the generating step further comprises:

providing a first preference level for the first unclosed product/service configured by the first negotiator agent module;

providing a second preference level for the second unclosed product/service configured by the first negotiator agent module;

providing a third preference level for the first unclosed product/service configured by the second negotiator agent module;

providing a fourth preference level for the second unclosed product/service configured by the second negotiator agent module; and generating the suggestion for winning probability exchanges when the first preference level is higher than the second preference level and the fourth preference level is higher than the third preference level.

2. The method of claim 1 wherein the preference level is represented by a preference coefficient, and a higher preference coefficient indicates a higher preference level.

3. The method of claim 1 wherein the preference level is represented by a predetermined value configured in an exceeding strategy, the exceeding strategy indicates that the first or second negotiator agent module places a bid advanced to the best bid in a virtual bidding room module when the inverse of a total number of negotiator agent modules placing the best bid is lower than the predetermined value, and a higher predetermined value indicates a higher preference level.

4. The method of claim 1 wherein the preference level is represented by the difference between the best bid and a reserve price for a particular unclosed product/service, the reserve price indicates the least acceptable price, and a higher difference indicates a higher preference level.

5. The method of claim 1 further comprising:

exchanging a second winning probability of the first negotiator agent module for the second unclosed product/service with a first winning probability for the first unclosed product/service owned by the second negotiator agent module; and randomly selecting a winning negotiator agent module for the first or second product/service contingent upon the exchanged winning probabilities.

6. The method of claim 1 wherein the service indicates a nursing shift.

7. A system for auction negotiation support, comprising:

a first negotiator agent module embedded in a first computer;

a second negotiator agent module embedded in a second computer; and a negotiation mediator module embedded in a third computer coupled to the first and second computers via a communication network, wherein the negotiation mediator module detects a negotiable collision set comprising a first and a second unclosed products/services, wherein the first and second unclosed products/services are distinct, the first unclosed product/service is contended for by the first and second negotiator agent modules, the second unclosed product/service is contended for by the first and second negotiator agent modules, the first negotiator agent module has a probability of winning the first or second product/service, the second negotiator agent module has the probability of winning the first or second unclosed product/service, the first and second negotiator agent modules have the same probability, the negotiation mediator module generates a suggestion for winning probability exchanges between the first and second negotiator agent modules contingent upon preference levels associated with the first and second unclosed products/services configured by the first and second negotiator agent modules, the generated suggestion indicates that the first negotiator agent module exchanges a second winning probability for the second unclosed product/service with a first winning probability for the first unclosed product/service owned by the second negotiator agent module; and wherein the negotiation mediator module acquires a first preference level for the first unclosed product/service configured by the first negotiator agent module, acquires a second preference level for the second unclosed product/service configured by the first negotiator agent module, acquires a third preference level for the first unclosed product/service configured by the second negotiator agent module, acquires a fourth preference level for the second unclosed product/service configured by the second negotiator agent module and generates the suggestion for winning probability exchanges when the first preference level is higher than the second preference level and the fourth preference level is higher than the third preference level.

8. The system of claim 7 wherein the preference level is represented by a preference coefficient, and a higher preference coefficient indicates a higher preference level.

9. The system of claim 7 wherein the preference level is represented by a predetermined value configured in an exceeding strategy, the exceeding strategy indicates that the first or second negotiator agent module places a bid advanced to the best bid in a virtual bidding room module when the inverse of a total number of negotiator agent modules placing the best bid is lower than the predetermined value, and a higher predetermined value indicates a higher preference level.

10. The system of claim 7 wherein the preference level is represented by the difference between the best bid and a reserve price for a particular unclosed product/service, the reserve price indicates the least acceptable price, and a higher difference indicates a higher preference level.

11. The system of claim 7 wherein the negotiation mediator module performs that the first negotiator agent module exchanges a second winning probability for the second unclosed product/service with a first winning probability for the first unclosed product/service owned by the second negotiator agent module, and randomly selects a winning negotiator agent module for the first or second product/service contingent upon the exchanged winning probabilities.

12. The system of claim 7 wherein the service indicates a nursing shift.

* * * * *